United States Patent

Mills

[15] 3,644,273

[45] Feb. 22, 1972

[54] MELT FLOW STABILIZATION OF POLYOLEFINS

[72] Inventor: Kenneth R. Mills, Bartlesville, Okla.
[73] Assignee: Phillips Petroleum Company
[22] Filed: Dec. 4, 1969
[21] Appl. No.: 882,350

[52] U.S. Cl. .......................260/41 A, 260/41 R, 260/45.7 S, 260/45.9 R, 260/45.9 GD, 260/94.9 GB
[51] Int. Cl. ....................................C08f 45/04, C08f 45/56
[58] Field of Search.............260/41, 45.7 SU, 45.9, 94.9 GB, 260/94.9 GD, DIG. 33

[56] References Cited

UNITED STATES PATENTS

| 3,075,943 | 1/1963 | Burgert.....................................260/38 |
| 3,464,952 | 9/1969 | Larsen....................................260/45.7 |
| 3,513,152 | 5/1970 | Hogan ....................................260/94.9 |

Primary Examiner—Morris Liebman
Assistant Examiner—J. H. Derrington
Attorney—Young and Quigg

[57] ABSTRACT

A method of incorporating a polymer melt flow stabilizer into a polymer by absorbing the stabilizer in a porous absorbent and incorporating the stabilizer-containing absorbent in the polymer.

10 Claims, No Drawings

MELT FLOW STABILIZATION OF POLYOLEFINS

This invention relates to the processing of polyolefins.

In one of its more specific aspects, this invention relates to a method of preventing a decrease in the melt-index value of polyolefins during processing.

The processing of polyolefins such as polypropylene and polyethylene and similar polymeric compounds is well known. Such processing frequently involves heating the polymer to a temperature at which it becomes molten and shaping the molten polymer by a thermoforming process such as extruding and injection, or blow molding. At molten temperatures, however, such polymers tend to decrease in melt flow and melt index, this decrease being known as melt index or melt flow dropoff. A decrease in melt flow, melt flow being the amount of polymer forcible through an orifice in a given time under a given load at a given temperature, indicates that the processing has altered the flow characteristics of the polymer from that desired value possessed by the polymer when produced.

The method of this invention provides a solution to such processing problems.

According to this invention there is provided a method for introducing polymer melt flow stabilizers into polymers which comprises adsorbing the melt flow stabilizer in a solid adsorbent and incorporating the solid adsorbent containing the melt flow stabilizer into the polymer.

Accordingly, it is an object of this invention to provide improved polymers.

It is another object of this invention to provide a method of melt flow stabilization of polyolefins which is of greater effect per quantity of stabilizing agent employed.

These and other objects of this invention will be evident from the following disclosure.

The method of this invention is applicable to polymers of 1-olefins having two to eight carbon atoms per molecule, these including homopolymers of ethylene, propylene and the like and copolymers of related materials. It is especially preferred in treating ethylene homopolymers and various copolymers of ethylene with other 1-olefins such as propylene, 1-butene and the like. Such polymers are produced by a number of processes including those disclosed in U.S. Pat. No. 2,825,721 to Hogan et al., and British Pat. No. 853,414. The method of this invention is applicable to these polymers as produced or containing additives conventionally included such as colorants, plasticizers and the like.

The method of this invention is applicable to the addition of various melt flow stabilizers, both liquid and gaseous, such as halogens, nitrogen dioxide, sulfur dioxide, or any other effective melt flow stabilizer. While such stabilizers are known to be effective in and of themselves, the method of this invention improves their effectiveness by allowing their greater incorporation and retention within the polymer.

For example, introduction of such stabilizing agents by themselves is frequently difficult because the moisture or air expelled by the polymer during its processing acts to prevent introduction of the agent into the polymer. Further, the retentive properties of the adsorbent allows incorporation of a greater proportion of the agent than would otherwise be possible, making the processing temperatures encountered considerably less effective in driving off the agent prior to its incorporation in the polymer.

The adsorbents or carriers, the use of which are contemplated by this invention, include any material exhibiting an adsorption capacity for the agent concerned, such capacity being sufficient to adsorb and hold the agent under the conditions involved and permit incorporation of the agent to a greater extent than the agent would be adsorbed and held in the plastic in the absence of the carrier. Such materials include molecular sieves, such as sodium aluminum silicate and hydrated alumina, zeolites, and porous adsorbents in general.

The agent is incorporated in the adsorbent in any suitable manner. Generally, the adsorbent will be dried and activated at an elevated temperature and then contacted with the agent concerned for a suitable length of time, preferably by passing the agent through a bed of the adsorbent until the adsorbent has adsorbed the desired quantity of the agent. The particle size of the adsorbent should be less than about 150 microns and preferably less than 50 microns, and a pore size of from about 10 to about 60 A.

The agent will be contained in the adsorbent in such quantities that from about 0.001 to about 0.5 pound of agent is introduced per hundred pound of polymer. To effect this, about 0.01 to about 5 pounds of agent-containing adsorbent will be incorporated in 100 pounds of polymer.

The agent-containing adsorbent can be incorporated in the polymer by any suitable mixing method which produces its thorough and uniform distribution. Mixing can be affected by Banbury and Brabender mixers, roll mills and the like, or by uniform introduction into an extruder. The incorporation of the agent-containing adsorbent into the polymer can be made by mixing with the polymer in the dry state, preferably just prior to the thermal processing of the polymer, or while the polymer is in the molten state.

The following data indicate the effectiveness of the method of this invention when incorporating a melt index drop preventative agent in a polymer.

EXAMPLE I

A sodium aluminum silicate adsorbent having a particle pore size of 10 A. and containing various weight percentages of $NO_2$ was incorporated in a polyethylene.

Melt flow values were determined on a polyethylene polymer at 550° F. under a load of 2,160 grams in terms of grams extruded per 5-minute period.

This temperature is higher than that temperature employed for these determinations for polyethylene in accordance with ASTM Procedure D 1238–62T, Condition E. However, this higher temperature was employed since the melt flow dropoff is more evident at this temperature with a melt flow dropoff of lesser magnitude being evident at the lower temperature prescribed by the ASTM Testing procedure.

In Run O, neither adsorbent nor $NO_2$ was incorporated in the polymer while in Run 3, only adsorbent alone was incorporated in the polymer. In the other runs, various quantities of both $NO_2$ and adsorbent were incorporated in the polymer, the $NO_2$ being adsorbed in the adsorbent and the resulting adsorbent being introduced into the polymer. Results were as follows:

TABLE I

| Run No. | Adsorbent incorporated, wt. percent of polymer | Wt. percent $NO_2$ incorporated in polymer | Melt flow after— | | | |
|---|---|---|---|---|---|---|
| | | | 5 min. | 10 min. | 15 min. | 20 min. |
| 0 | 0.0 | 0 | 0.13 | 0.06 | 0.05 | 0.05 |
| 1 | 1.9 | 0.008 | 0.26 | 0.23 | 0.25 | 0.25 |
| 2 | 1.9 | 0.08 | 0.33 | 0.26 | 0.26 | 0.27 |
| 3 | 2.4 | 0 | 0.24 | 0.11 | 0.09 | 0.06 |
| 4 | 2.4 | 0.02 | 0.29 | 0.27 | 0.26 | 0.26 |
| 5 | 2.4 | 0.04 | 0.31 | 0.23 | 0.19 | 0.24 |

These data indicate the effectiveness of the method of this invention in incorporating the agents concerned into a polymeric material when employing sodium aluminum silicate as the adsorbent.

EXAMPLE II

A similar set of runs was made employing $NO_2$ as the agent adsorbed in hydrated alumina having a pore diameter of about 60 A. Procedures were as described for Example I. Results were as follows:

TABLE II

| Run No. | Adsorbent incorporated, wt. percent of polymer | Wt. percent NO₂ incorporated in polymer | Melt flow after— | | | |
|---|---|---|---|---|---|---|
| | | | 5 min. | 10 min. | 15 min. | 20 min. |
| 00 | 0 | 0 | 0.13 | 0.06 | 0.05 | 0.05 |
| 6 | 3.5 | 0 | 0.09 | 0.05 | 0.04 | 0.03 |
| 7 | 3.4 | 0.02 | 0.35 | 0.29 | 0.30 | 0.28 |
| 8 | 3.9 | 0.008 | 0.32 | 0.24 | 0.24 | 0.22 |
| 9 | 3.9 | 0.08 | 0.35 | 0.31 | 0.28 | 0.28 |
| 10 | 4.0 | 0.04 | 0.39 | 0.31 | 0.31 | 0.32 |

These date indicate the effectiveness of the method of this invention in incorporating the agents concerned in a polymeric material employing hydrated alumina as the adsorbent.

In order to illustrate the beneficial and unexpected improvement of the present method of introducing such agents over introducing the agents into the polymer in the absence of the adsorbents, the following runs were made.

EXAMPLE III

A second polyethylene was subjected to melt flow determinations. $NO_2$ was added to a second sample of the same polymer and melt flow values were determined. $NO_2$ was then incorporated in samples of the polymer employing two different adsorbents and melt flow values again determined. Results were as follows:

TABLE III

| Run No. | Adsorbent incorporated, wt. percent of polymer | Wt. percent NO₂ incorporated in polymer | Melt flow after— | | | | Approx. overall change, percent |
|---|---|---|---|---|---|---|---|
| | | | 5 min. | 10 min. | 15 min. | 20 min. | |
| 11 | 0.0 | 0 | 0.13 | 0.07 | 0.07 | 0.07 | |
| 12 | ¹ 0.18 | 0 | 0.09 | 0.07 | 0.07 | 0.07 | |
| 13 | ² 0.18 | 0 | 0.07 | 0.05 | 0.04 | 0.04 | |
| 14 | 0.0 | 0.005 | 0.14 | 0.12 | 0.12 | 0.11 | 21 |
| 15 | 0.0 | 0.01 | 0.32 | 0.17 | 0.15 | 0.13 | 59 |
| 16 | ¹ 0.18 | 0.005 | 0.27 | 0.23 | 0.23 | 0.22 | 18 |
| 17 | ¹ 0.18 | 0.01 | 0.35 | 0.30 | 0.30 | 0.29 | 17 |
| 18 | ² 0.18 | 0.005 | 0.22 | 0.19 | 0.19 | 0.19 | 13 |
| 19 | ² 0.18 | 0.01 | 0.27 | 0.20 | 0.20 | 0.20 | 21 |

[1] Sodium aluminum silicate, 10 A. pore size incorporated in Runs 12, 16 and 17.
[2] Hydrated alumina incorporated in Runs 13, 18 and 19.

These data indicate the definite superiority of the method of the present invention for the introduction of melt flow affecting agents. When incorporating the same quantity of the agent in the polymer in the absence of the adsorbent, the percentage change in the melt flow between the 5 and 20 minute points was about 21 to about 59 percent. When the agent was incorporated in the polymer in an adsorbent according to the method disclosed herein, this change was reduced to about 13 to about 26 percent, depending upon the amount of the agent incorporated.

It will be noted that the foregoing data indicates that the method of this invention not only retards melt index dropoff but, in comparison with the melt index values of the untreated polymer, increases the melt index of the polymer.

It will be evident from the above discussion that various modifications can be made to the method of this invention. However, such modifications are considered as being within the scope of this invention.

What is claimed is:

1. A method of incorporating a polymer melt flow stabilizing agent into a polymer selected from homopolymers and copolymers of 1-olefins having two to eight carbon atoms per molecule which comprises contacting a porous adsorbent with said agent to produce an agent-containing adsorbent and incorporating said agent-containing adsorbent into said polymer in an amount sufficient to provide in said polymer from about 0.001 to about 0.5 pound of said agent per 100 pounds of said polymer.

2. The method as defined in claim 1 in which said adsorbent is selected from the group consisting of molecular sieves and zeolites.

3. The method as defined in claim 1 in which said adsorbent is introduced into said polymer in an amount from about 0.01 to about 5 pounds per 100 pounds of polymer.

4. The method as defined in claim 1 in which said adsorbent is activated at elevated temperatures and purged with nitrogen prior to contacting with said agent.

5. The method as defined in claim 1 in which said adsorbent has a particle size of less than about 150 microns.

6. The method as defined in claim 1 in which said absorbent has a pore size of from about 10 to about 60 A.

7. The method as defined in claim 1 in which said adsorbent is incorporated into said polymer, said polymer being in the dry state.

8. The method as defined in claim 1 in which said adsorbent is incorporated into said polymer, said polymer being in the molten state.

9. The method as defined in claim 1 in which a sodium aluminum silicate is contacted with $NO_2$ to produce an $NO_2$-containing sodium aluminum silicate and said sodium aluminum silicate is incorporated into a polyethylene polymer in an amount of from about 0.01 to about 5 of adsorbent per 100 pounds of polymer and in an amount sufficient to introduce from about 0.001 to about 0.5 pounds of said agent per 100 pounds of polymer.

10. The method of claim 1 in which said polymer is polyethylene, said stabilizing agent is $NO_2$ and said adsorbent is hydrated alumina, said agent-containing adsorbent being incorporated in said polyethylene in an amount to provide in said polyethylene a hydrated alumina concentration of about 4 weight percent and a $NO_2$ concentration of about 0.04 weight percent.

* * * * *